Patented Aug. 17, 1926.

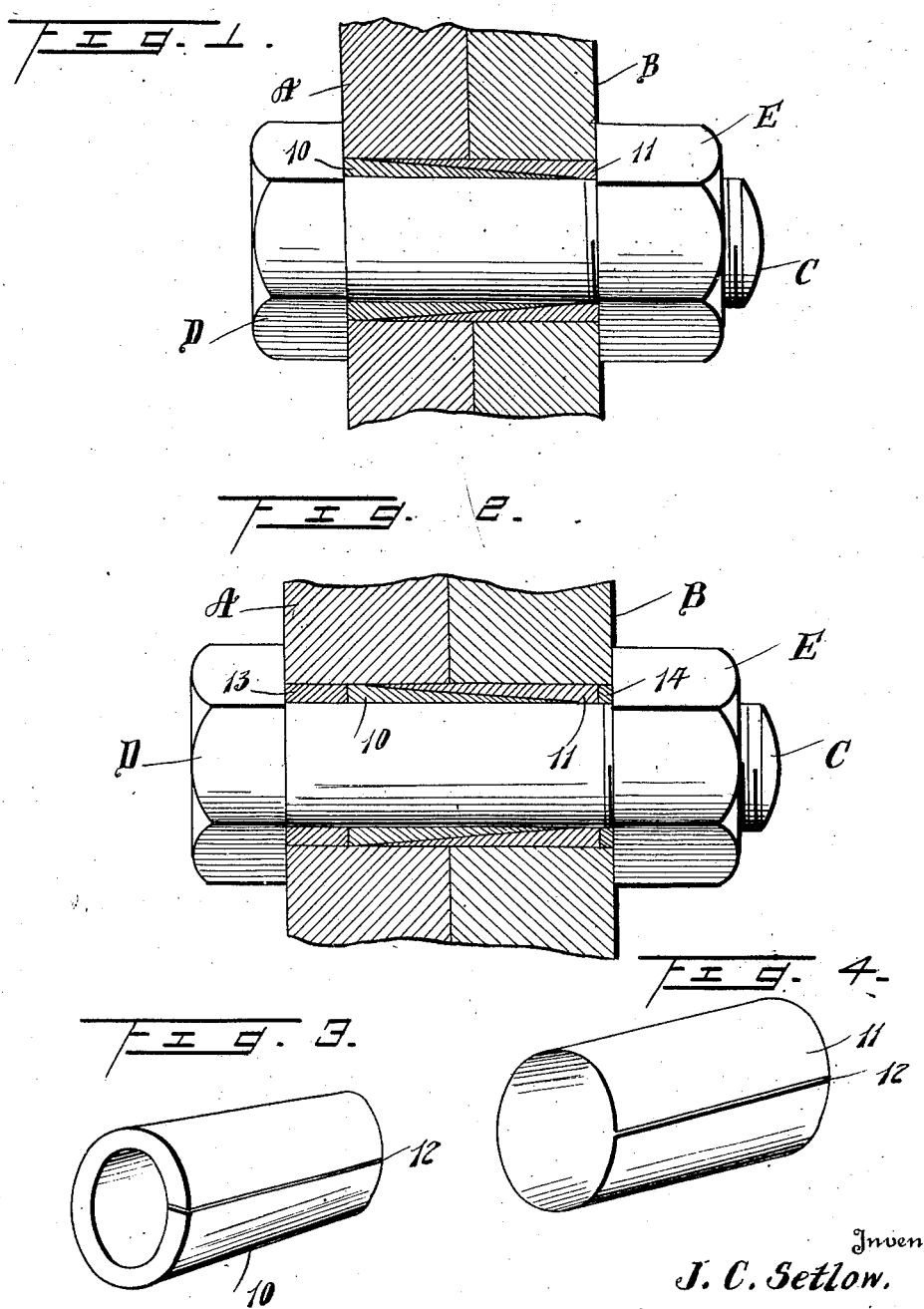

1,596,856

UNITED STATES PATENT OFFICE.

JOHN C. SETLOW, OF PONTIAC, MICHIGAN.

EXPANSION BUSHING FOR BOLTS.

Application filed November 8, 1924. Serial No. 748,790.

This invention relates to a bushing for bolts.

It is primarily aimed to provide a construction for use where the strain on a bolt, rivet or the like, is not steady but changes to different angles, and which in the present construction results in the bolt holes becoming larger and the bolts wearing smaller.

It is particularly aimed to provide a bushing in sections which are collectively truly of tubular form and engage each other along an inclined plane.

Additional objects and advantages will become apparent from a consideration of the description following, taken in connection with the accompanying drawing illustrating an operative embodiment.

In said drawing:—

Figure 1 is a view showing the bolt in elevation, between fastened parts, the latter being in section, and my invention also being shown in section;

Figure 2 is a view similar to Figure 1, showing also the use of a spacer and a washer;

Figure 3 is a perspective view of one of the bushing sections; and

Figure 4 is a perspective view of the other bushing section.

Like reference characters designate like or similar parts in the different views.

Referring to the drawing, and first to Figure 1, two elements A and B are shown as fastened together by a bolt C having a head D at one end and a nut E at the other end. Disposed in the bolt holes through the sections A and B snugly and surrounding the shank or bolt C is a bushing consisting of sections 10 and 11. These sections are wedge-shape in longitudinal section so that they will engage along an inclined plane as shown, and so that collectively they will truly form a tube. To bring about this result, the inner wall of the section 10 is beveled toward the outer edge at one end and the section 11 at its outer surface is beveled toward its inner surface. Both sections 10 and 11 are preferably split longitudinally as at 12 to permit contraction and expansion. One end of each section is substantially feathered.

The sections 10 and 11 are applied in the bolt hole with their feathered edges facing each other. By this telescopic method of application, the bushing becomes thicker or expands and snugly occupies the bolt hole and efficiently grips the shank of the bolt C. This makes it practical to fill up any space which may exist between a bolt and the pieces or elements A and B which it holds together.

When the bushing happens to be too short for a given hole, a washer such as that shown at 13, may be applied to the bolt shank as an extension of the bushing. Also and for the same purpose, a washer such as 14, shown in Figure 2, may also be used.

I claim as my invention:—

In combination with a bolt, a bushing through which the bolt passes having a tubular section provided with an interior inclined wall, a section coacting with the first mentioned section having an exterior inclined wall engageable with the inclined wall of the first mentioned section, said sections collectively being truly cylindrical and of tubular form, said sections at opposite ends being substantially feathered.

In testimony whereof I affix my signature.

JOHN C. SETLOW.